(12) United States Patent
Millard

(10) Patent No.: US 11,241,628 B2
(45) Date of Patent: Feb. 8, 2022

(54) AUGMENTED GAMING WITH ITEM GIFTING AND ONLINE GAMEPLAY

(71) Applicant: Chad Sterling Millard, Bremerton, WA (US)

(72) Inventor: Chad Sterling Millard, Bremerton, WA (US)

(*) Notice: Subject to any disclaimer, the term of this patent is extended or adjusted under 35 U.S.C. 154(b) by 0 days.

(21) Appl. No.: 16/918,964

(22) Filed: Jul. 1, 2020

(65) Prior Publication Data

US 2022/0001284 A1 Jan. 6, 2022

(51) Int. Cl.
| | | |
|---|---|---|
| A63F 13/00 | (2014.01) | |
| A63F 13/795 | (2014.01) | |
| A63F 13/87 | (2014.01) | |
| A63F 13/67 | (2014.01) | |
| G06Q 30/06 | (2012.01) | |
| A63F 13/23 | (2014.01) | |
| G06T 19/00 | (2011.01) | |

(52) U.S. Cl.
CPC .......... *A63F 13/795* (2014.09); *A63F 13/23* (2014.09); *A63F 13/67* (2014.09); *A63F 13/87* (2014.09); *G06Q 30/0635* (2013.01); *G06Q 30/0641* (2013.01); *G06T 19/006* (2013.01)

(58) Field of Classification Search
CPC ........ G06T 19/006; G06T 19/20; G06T 17/00
See application file for complete search history.

(56) References Cited

U.S. PATENT DOCUMENTS

| | | | | |
|---|---|---|---|---|
| 2013/0185354 A1* | 7/2013 | Seligstein | ............. | A63F 13/655 709/204 |
| 2013/0215116 A1* | 8/2013 | Siddique | ............. | G06Q 20/204 345/420 |
| 2014/0100997 A1* | 4/2014 | Mayerle | ............. | G06Q 30/0276 705/27.2 |
| 2018/0342106 A1* | 11/2018 | Rosado | ................... | A63F 13/60 |

\* cited by examiner

*Primary Examiner* — Omkar A Deodhar
*Assistant Examiner* — Eric M Thomas
(74) *Attorney, Agent, or Firm* — Galvin Patent Law LLC; Brian R. Galvin

(57) ABSTRACT

A system and methods for augmented gaming with item gifting and online gameplay, that combines physical games and objects with online functionality to produce an augmented-reality gaming experience.

4 Claims, 10 Drawing Sheets

US 11,241,628 B2

AUGMENTED GAMING WITH ITEM GIFTING AND ONLINE GAMEPLAY

CROSS-REFERENCE TO RELATED APPLICATIONS

None.

BACKGROUND

Field of the Art

The disclosure relates to the field of gaming, and more particularly to the field of combining physical games and objects with online gameplay and social elements.

Discussion of the State of the Art

In traditional gaming (that which uses physical items and playing areas, rather than videogames that exist in a digital context), players generally must be at the same location to interact and play a game, limiting their ability to play based on their ability to gather with other players. While some players may use various telecommunications methods to coordinate these games over a distance (such as phone calls, text chat, or videoconferencing), there is no way to merge gameplay elements with existing communications methods and coordination is difficult. This also creates a barrier against recruiting new players, that may need to obtain the game items and materials as well as learn how to play without having another player physically present to assist.

What is needed, is a means to provide game objects to new players remotely, and to merge physical game objects and traditional gameplay with long-distance communications so that players may enjoy traditional games regardless of their location or proximity to one another.

SUMMARY

Accordingly, the inventor has conceived and reduced to practice, a system and methods for augmented gaming with social networking and online gameplay, that combines physical games and objects with online functionality to produce an augmented-reality gaming experience.

According to one aspect, a system for augmented gaming, comprising: a profile server comprising at least a processor, a memory, and a plurality of programming instructions stored in the memory and operating on the processor, wherein the programming instructions, when operating on the processor, cause the processor to: store user information in a player profile within a data storage; associate a plurality of stored player profiles to produce a player network; receive a unique ID token from a user device; select a gift order based on the received unique ID token; receive recipient information from the user device, the recipient information comprising either a shipping address or a stored player profile comprising a shipping address; transmit the recipient information and the gift order to a retail API; transmit a game invite to a player profile within the player network; a retail API comprising at least a processor, a memory, and a plurality of programming instructions stored in the memory and operating on the processor, wherein the programming instructions, when operating on the processor, cause the processor to: receive the gift order and recipient information from the profile server; transmit the gift order and recipient information to a retail provider for fulfillment; a game engine comprising at least a processor, a memory, and a plurality of programming instructions stored in the memory and operating on the processor, wherein the programming instructions, when operating on the processor, cause the processor to: store game rules and game object data corresponding to a game; receive gameplay information from a plurality of players participating in the game; perform a comparison between the received gameplay information against the stored game rules and game object data; generate a notification based on the results of the comparison; transmit the generated notification to at least one of the plurality of players, is disclosed.

According to another aspect of the invention, a method for augmented gaming, comprising the steps of: receiving, at a profile server, a unique ID token; selecting a gift order based on the unique ID token; receiving recipient information, the recipient information comprising either a shipping address or a stored player profile comprising a shipping address; transmit, using a retail API, the gift order and shipping address to a retail provider for fulfillment; receive, at a game engine, gameplay information from a plurality of players participating in a game; comparing the received gameplay information against stored game rules and game object data; generating a notification based on the results of the comparison; and transmitting the notification to at least a portion of the plurality of players, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
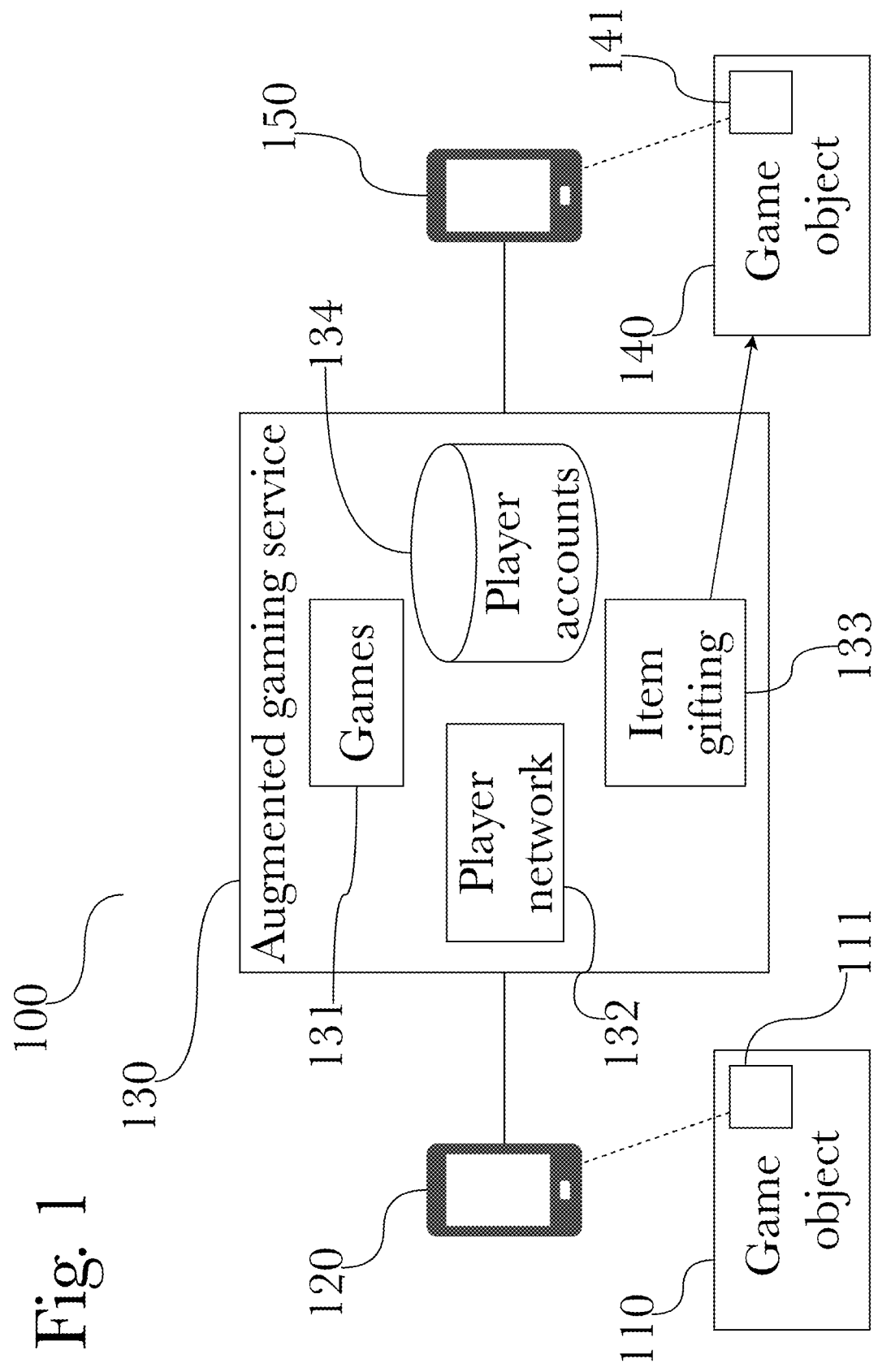
FIG. 1 is a block diagram illustrating a general overview of augmented gaming operation, according to one aspect.

The inventor has conceived, and reduced to practice, a system and methods for augmented gaming with social networking and online gameplay, that combines physical games and objects with online functionality to produce an augmented-reality gaming experience.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating a general overview 100 of augmented gaming operation, according to one aspect. A first player may purchase a game object 110 such as (for example, including but not limited to) a deck of cards, figurine, set of dice, rulebook, or other item that may be used in, or is otherwise relevant to, an augmented game. The game object 110 may be paired with a unique ID token 111, such as (for example, including but not limited to) a barcode, QR code, serial number, NFC or other RFID tag, or other such identification techniques that may be used to uniquely identify the game object 110. A unique ID token 111 may be an integral part of game object 110, for example as a printed or etched QR code, or an embedded NFC tag that may be scanned by the first player (such as using a smartphone 120 or other suitable device). When scanned (which may direct the first player's device 120 to an appropriate web resource such as an augmented gaming service webpage, or may automatically create a message to be sent to an augmented gaming service) or entered (as may be the case with a serial number that must be typed into an appropriate software application or web page by the first player), the unique ID token 111 is sent to an augmented gaming service 130, which associates the purchased game object 110 with the first player's user account (optionally prompting the first player to set up a user account if they do not have one), enabling the use of the game object 110 within an augmented game. This enables physical items to correspond to electronic functionality for playing local or online electronic games with other players, such as enabling the first player to use a purchased deck of cards in a card game, or adding a purchased figurine to their collection for use in a miniature-based strategy game.

In addition, game objects 110 may take forms that are primarily or entirely suited for electronic gameplay, such as simple voucher cards with a unique ID token 111, that function primarily as a medium for distributing such ID tokens 111. For example, a player may purchase a pack of cards that includes a plurality of augmented cards that, instead of their usual text or contents, simple display an ID token 111 that must be scanned to reveal the card's contents.

This type of augmented game object 110 may be used to provide additional in-game functionality that is not possible in a physical game using actual cards, for example a card's ID token 111 may enable a user to change the background or layout of a game table, alter the flow of timing within a game, or other phenomena that are only made possible through the use of an electronic game engine.

A unique ID token 111 may also function as a redemption voucher for a plurality of additional items or functions, such as electronic-only items for use within an augmented game, limited-use actions for use within an augmented game (for example, a "special ability" that may be unlocked by scanning the token 111), or additional physical items that may be redeemed. An item gifting 133 service may allow some or all additional items, or other items in a user's player account (for example, a user may be able to "gift" electronic game items such as special abilities or in-game currency that they have obtained within a game separately from scanned ID tokens) to be sent to other players, for example so that a matching deck of cards may be sent to a friend, or in-game abilities may be given to other players to facilitate team-based strategy. In the case of physical items, the operator of an augmented gaming service 130 may then collect the recipient's shipping information from the first player, or retrieve it from a stored player account 134 for the recipient if available (such as if the recipient is already a player of an augmented game provided by the service operator), and any gifted physical items may be shipped to them for use. The recipient then receives a game object 140 with associated ID token 141, which they may then scan with their mobile device 150 to associate the game object and any functionality enabled by the ID token with their player account (again, setting up a new account if necessary). The players may also be automatically added to each other's player network based on the known association between them-player A chooses to "gift" a game object to player B, therefore they must know each other in some fashion and likely wish to play a game together.

Augmented gaming service 130 may provide a plurality of gaming and social features to users, oriented around encouraging users to play games and interact with one another within the framework of the augmented gaming environment. A user may play games 131 using virtual objects based on physical game objects 110 whose associated ID token 111 the user has scanned, optionally combined with electronic-only elements to merge the physical and virtual gameplay elements into an augmented game that takes advantage of the capabilities offered by a software-based environment. An augmented game may also utilize a plurality of player interaction modes, such as (for example, including but not limited to) text-based chat, voice calls such as voice-over-IP (VoIP), or videoconferencing functionality. Player interaction may be further enhanced with augmented reality features where appropriate, such as using text recognition to scan a player's cards and reproduce them within a game engine, or providing a dice-rolling function within a chat interface that players may use, or other such operations. These augmented-reality features provide an engaging user experience as well as both allowing players to utilize their physical game items within a software-based videogaming environment, and ensuring all players adhere to the rules as the game engine operates within software. For example, a card game may observe players drawing and then scan the cards in their hands to "digitize" them into their hand within the game engine, or a dice-based game may utilize a built-in dice rolling function to preventing cheating. Various additional features may be provided on a per-game basis according to the nature of the game or game objects involved, for example a miniature-based strategy game may enforce known game rules such as movement or turn order, or a card game may scan a player's cards and match them with stored information about each card's information and abilities, ensuring they are used correctly as their gameplay is enforced within the game engine (in other words, the game engine has full knowledge of the rules and all cards, preventing misunderstanding of a card's operation or cheating through the use of altered or banned cards).

A user may maintain a player network 132 to track other player accounts 134 for invitation to games, team building, or communication within the augmented gaming service. Individual players may be added, removed, invited, blocked, grouped, or otherwise managed within a user's player network, enabling the user to curate a plurality of social relationships with other players. For example, a user may add a number of players to a group for a particular game, to provide convenient interaction with teammates or friends within a game.

Figure 2:
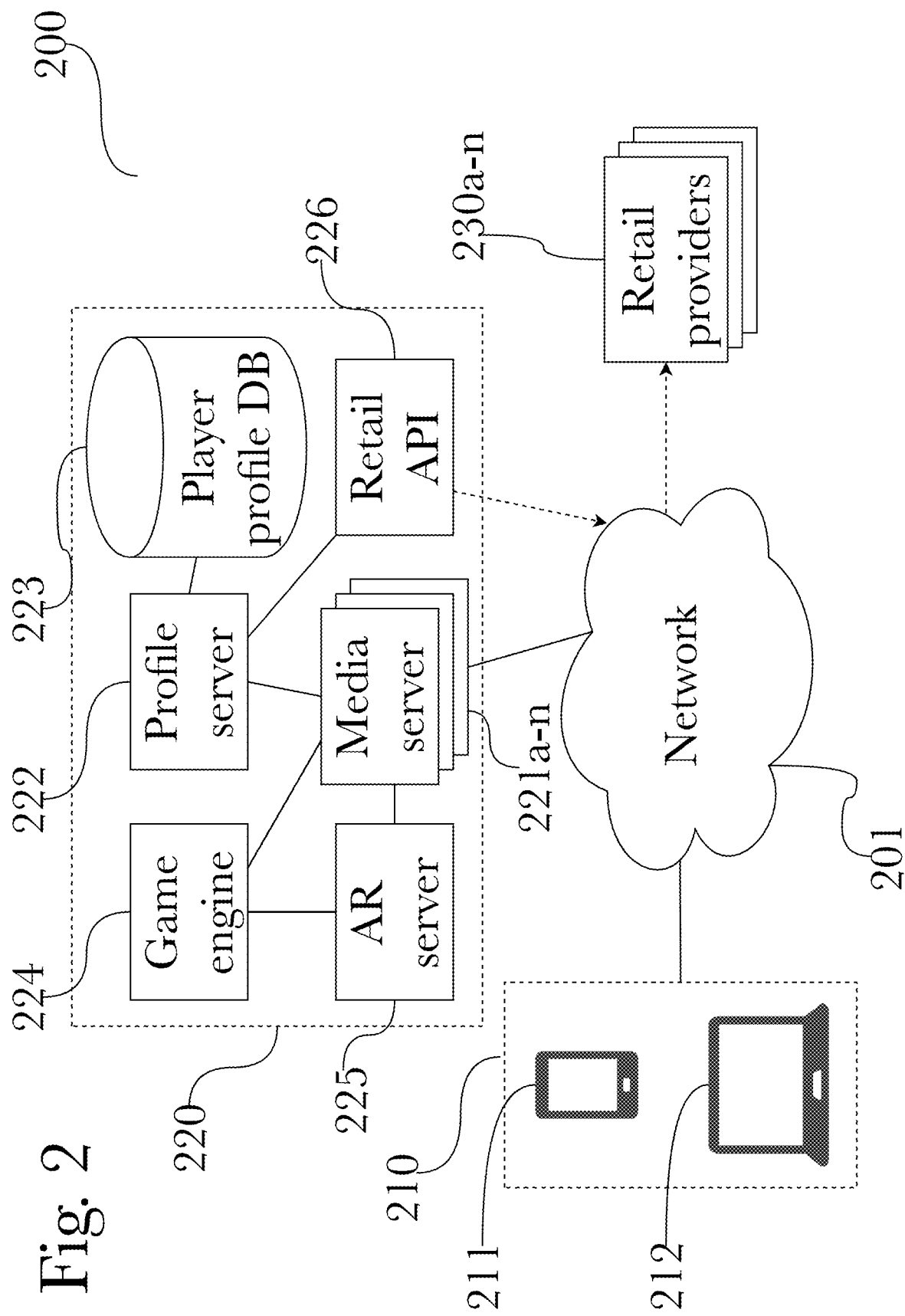
FIG. 2 is a block diagram illustrating an exemplary system architecture for an augmented gaming system, according to one aspect.

FIG. 2 is a block diagram illustrating an exemplary system architecture 200 for an augmented gaming system, according to one aspect. According to the aspect, players 210 may use their personal devices such as (for example, including but not limited to) a smartphone 211 or laptop computer 212 to connect via a network 201 such as the Internet or a local area network (LAN). Players may connect to an augmented gaming system 220 via a plurality of media servers 221a-n, that may provide a variety of connected functionality according to the user's device, connection type, software or hardware they may be using to connect, or other such variables. For example, a web server may be used to provide web-based content such as webpages with embedded chat or other game functionality, or a VoIP server may be used to provide voice-over-IP audio calling capability. Other various media servers may be used to provide a wide variety of communication technologies such as (including, but not limited to) text-based messaging between individual players, chatroom-style group messaging for multiple players, email, audio-based calling, video-based calling, group calling, or other forms of interaction between connected players. Additionally, media servers 221a-n may be operated by a third-party service such that augmented gaming may be provided in combination with an existing communication service or application that may already be familiar to the players, such as (for example, including but not limited to) SKYPE™ or ZOOM™ video calling services.

A profile server 222 may be used to store and provide player profiles in a database 223, storing known information about a player such as (for example, including but not limited to) their username, location, shipping information, ID tokens they have scanned, associated physical game objects based on scanned ID tokens, stored electronic content provided by scanned ID tokens, earned electronic content from playing games or performing special tasks, player networks comprising other profiles associated with and curated by the player, or any other information that may be relevant to, or associated with, a given player through their stored account. Profile server 222 is thus responsible for providing both a user's account information and their stored player networks comprising other players they know or have interacted with, such as groups for team-based games, friend lists, or players they've previously played with.

A game engine 224 may be used to store and provide game-specific functionality such as rules enforcement or scorekeeping, according to the nature of a particular game being played. For example, a card game with two players may only require simple scorekeeping as the players hold physical cards that inherently enforce the basic gameplay involved, while a more complex augmented card game may include electronic effects that are enforced by the game engine 224. For example, an electronic effect may alter the screen displayed to one player to provide an additional challenge, or provide visual effects that coincide with the card-based gameplay such as when an effect written on a card is invoked by its player. Thus it can be appreciated that the extent and nature of functions provided by game engine 224 may vary widely between games, according to what is appropriate or required for the game to operate.

An augmented reality (AR) server 225 may be used to provide further functionality within a game, by providing various AR functions to enhance gameplay. For example, AR server 225 may analyze the interaction between players via media servers 221*a-n*, such as using text, audio, or image recognition (according to the nature of the interaction, whether it is text, audio, or video-based respectively) to identify game objects in use or player activities such as drawing cards or moving pieces on a game board or playing surface. AR server 225 may also retrieve known rules and game information from game engine 224, so that the AR functions provided may be used to provide additional capability within the proper scope of the game being played, or to enforce rules by identifying gameplay as it unfolds. For example, in a card game being played over a video chat, players may be prompted to show their hands to the camera so that AR server 225 may identify their cards and process any gameplay functions thereof. Players therefore cannot cheat by manipulating the cards they have available, as the AR server 225 maintains knowledge of what is in each player's hand. When cards are played, AR server 225 may scan and identify what card has been played and enforce proper gameplay, for example by ensuring that the next card played is from a set of allowable cards, or by ensuring that the card's printed text is followed (such as for a card that requires specific actions be performed, such as manipulating a player's hand or deck, or performing various tasks or activities). AR functionality may be enabled, disabled, or modified, according to the nature of the game being played or player preference. For example, some players may prefer a strictly-enforced game with AR functions enabled, while others may prefer a more casual experience or do not wish their conversations to be analyzed for privacy reasons, and opt to disable AR functionality.

A retail application programming interface (API) 226 may be used to interact with a number of retail providers 230*a-n* through various means, such as a provider's website, a chat interface, or audio call interactive voice response (IVR) system. This may be used to enable automated placement of product orders on behalf of players, to facilitate game object redemption or gifting (as described previously, with reference to FIG. 1). In this manner, players may redeem physical items either for themselves or to be given to other players, and the augmented gaming system 220 will automatically place the required order for the item with a retail provider 230*a-n* using the retail API 226, ensuring the correct item is sent to the recipient.

Detailed Description of Exemplary Aspects

Figure 3:
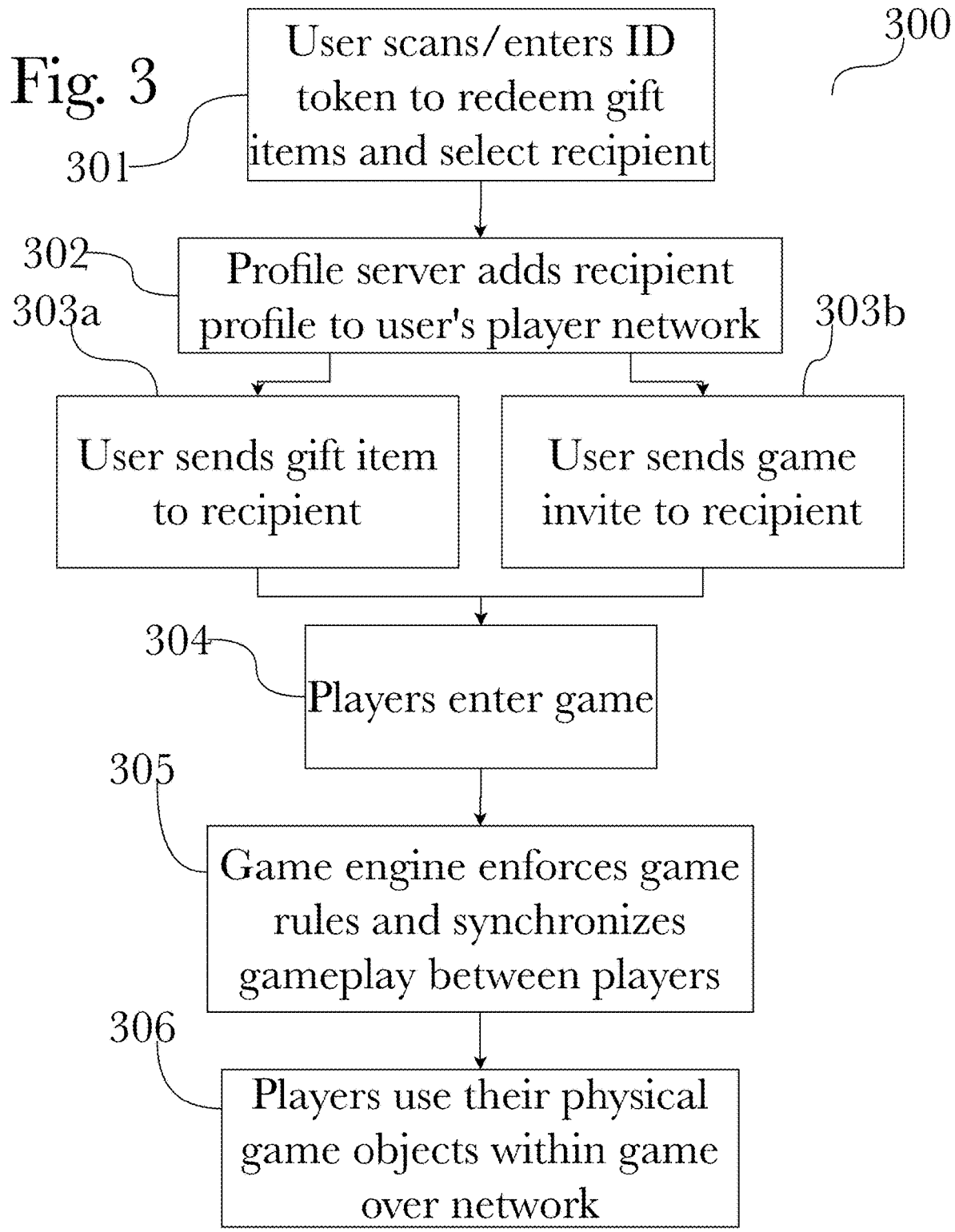
FIG. 3 is a flow diagram illustrating a general overview of augmented gaming service operation, according to one aspect.

FIG. 3 is a flow diagram illustrating a general overview 300 of augmented gaming service operation, according to one aspect. In an initial step 301, a user may scan or enter a unique ID token 111 from a physical game object 110 to redeem a gift item (whether physical or digital). A profile server may then add the selected recipient for the redeemed gift item to the user's player network 302, associating the two players so they may more easily interact in the future. The user may then send the gift item to a recipient based on the stored player profile 303*a* (for example, the recipient's player profile may include their shipping information for receiving gift items, which may or may not be made visible to the sender of the gift item), or they may immediately send a game invite to the other player 303*b*, for example if they do not require the gift item to be redeemed before playing. The players may then enter a game 304, wherein a game engine 224 may be used to enforce rules and gameplay, and synchronize the game state between participating users 305 to ensure the game flows smoothly for everyone. During the game, players may play using their physical game objects 306 as appropriate, such as a deck of cards or collection of miniatures for a tabletop game, or other such arrangements based on the nature of the game being played.

Figure 4:
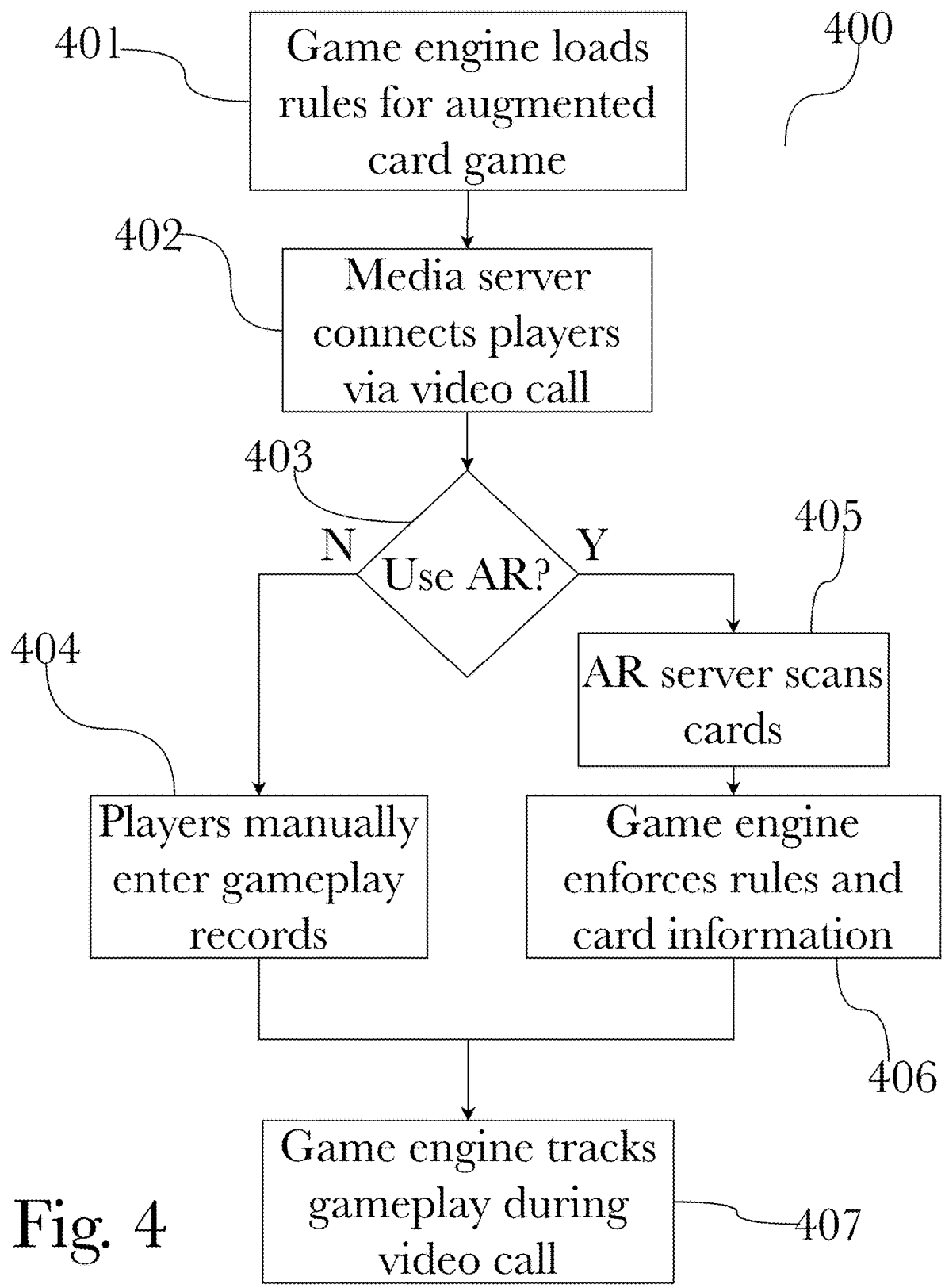
FIG. 4 is a flow diagram illustrating an exemplary method for augmented card-based gameplay, according to one aspect.

FIG. 4 is a flow diagram illustrating an exemplary method 400 for augmented card-based gameplay, according to one aspect. In an initial step 401, a game engine 224 loads rules for a card game, such as basic gameplay rules and known card information. Players may then connect via a video call 402 using a media server 221*a-n*, and may decide whether to enable AR features for the game 403. If AR use is declined or unavailable, players may manually enter gameplay records 404 such as keeping score and taking notes. If AR use is selected, an AR server 225 may scan players' cards 405 to store records of each player's hand, deck, or cards in play. Using AR card-scanning, the game engine 224 may now enforce gameplay and features of card information such as actions to be performed 406. Gameplay then proceeds 407, with game engine 224 tracking gameplay using AR scanning and recognition or manually-entered data provided by users, or various combinations of the two.

Figure 5:
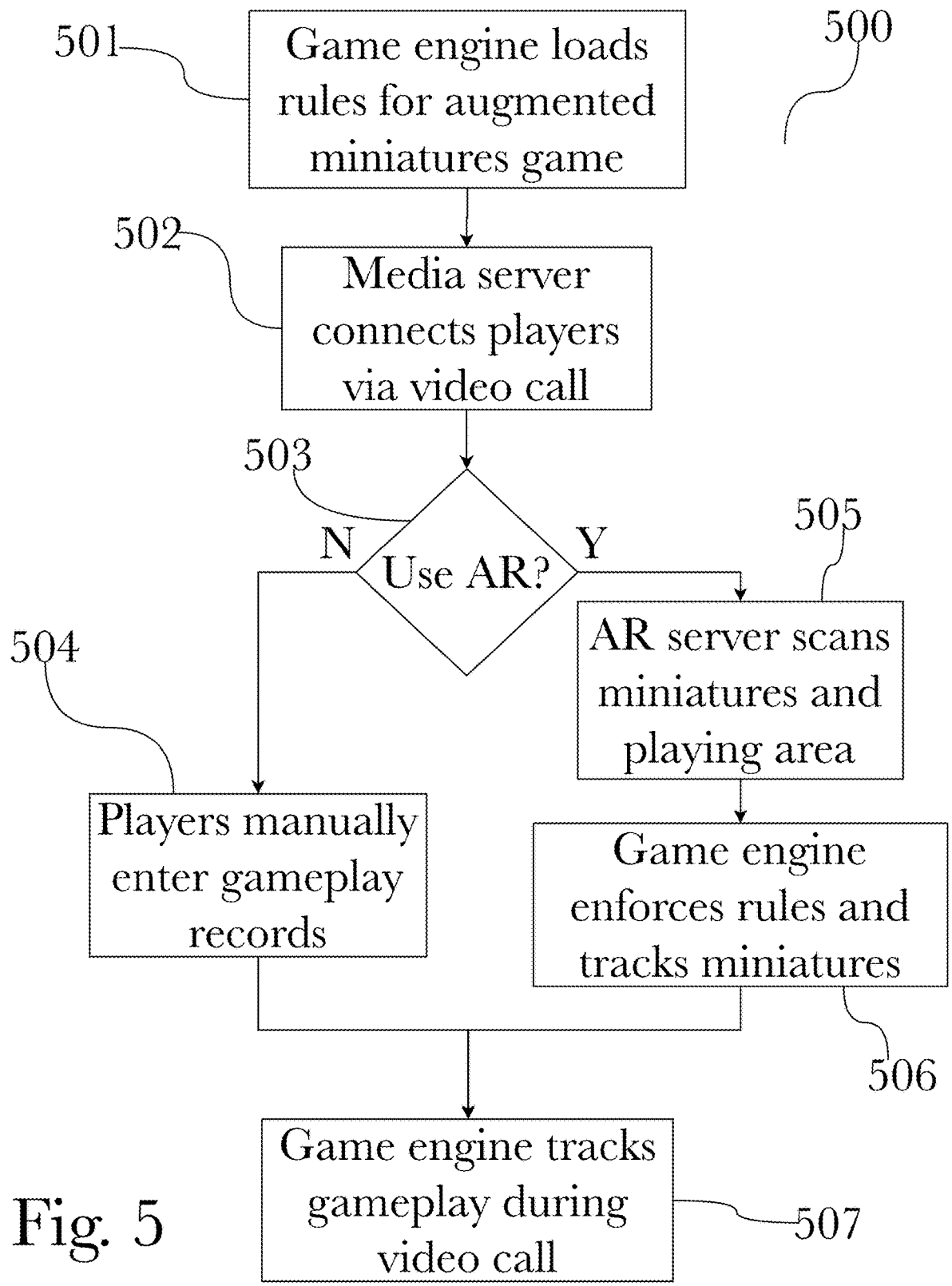
FIG. 5 is a flow diagram illustrating an exemplary method for augmented miniature-based gameplay, according to one aspect.

FIG. 5 is a flow diagram illustrating an exemplary method 500 for augmented miniature-based gameplay, according to one aspect. In an initial step 501, a game engine 224 loads rules for a miniature-based tabletop game, such as basic gameplay rules and known information on various miniature figurines. Players may then connect via a video call 502 using a media server 221*a-n*, and may decide whether to enable AR features for the game 503. If AR use is declined or unavailable, players may manually enter gameplay records 504 such as keeping score and taking notes. If AR use is selected, an AR server 225 may scan a playing space and miniatures 505 to store records of each player's miniatures (such as their characters for a roleplaying game, or their army for a wargame) and the layout of the playing area (such as to identify terrain or features representing objects with corresponding gameplay elements or rules). Using AR scanning, the game engine 224 may now enforce gameplay and track game progress automatically 506, such as tracking movements of various miniatures and alerting players if a movement is illegal. For example, players may be warned that they moved a figurine across terrain that should prevent movement of that character, or they may be alerted if they moved too great a distance in one turn, or other such rules according to the particular game being played. Gameplay then proceeds 507, with game engine 224 tracking gameplay using AR scanning and recognition or manually-entered data provided by users, or various combinations of the two.

Figure 6:
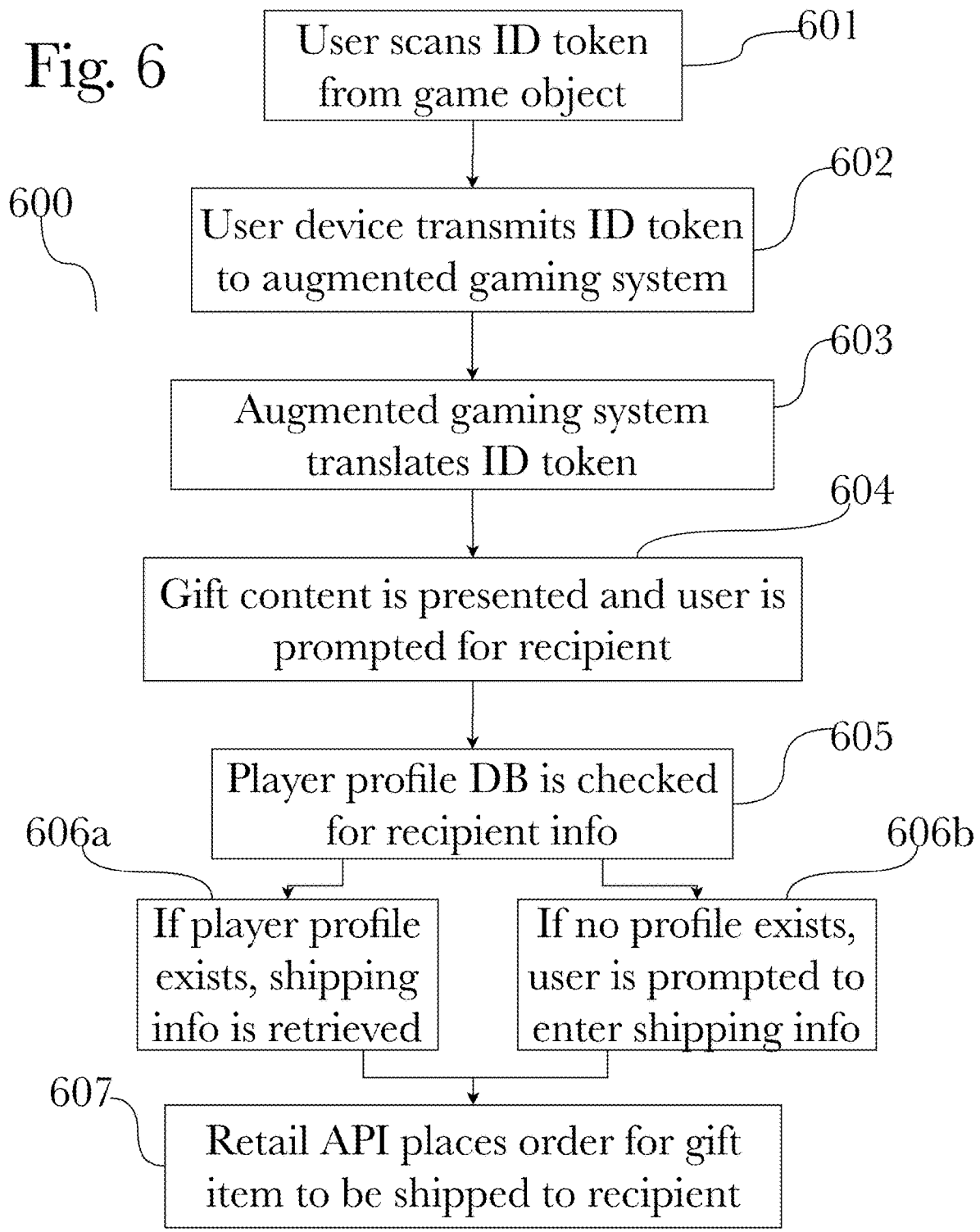
FIG. 6 is a flow diagram illustrating an exemplary method for item gifting, according to one aspect.

FIG. 6 is a flow diagram illustrating an exemplary method 600 for item gifting, according to one aspect. In an initial step 601, a user may scan or enter a unique ID token 111 associated with a physical game object 110, such as a QR code or barcode printed or engraved on the item, or a serial number bundled with the item that must be manually typed into an app or website to redeem. Upon entry, the user's device then transmits 602 the ID token 111 to an augmented gaming system 220, which then translates 603 the ID token to determine what content it should redeem. The gift content is then presented to the user 604, and they may be prompted to select or enter a recipient for the gift. A profile database 223 may then be checked 605 for the recipient's information, and if a corresponding player profile is found 606a the recipient's shipping information may be retrieved from the profile. If no profile is found 606b, the user may then be prompted to enter shipping information so the gift may be sent to an individual that does not yet have a player profile (thereby encouraging the addition of new players by offering them free gifted items with which they can play). A retail API 226 then contacts an appropriate retail provider 230 and places an order automatically, so that the gifted item(s) are then sent to the recipient's shipping address 607.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 7:
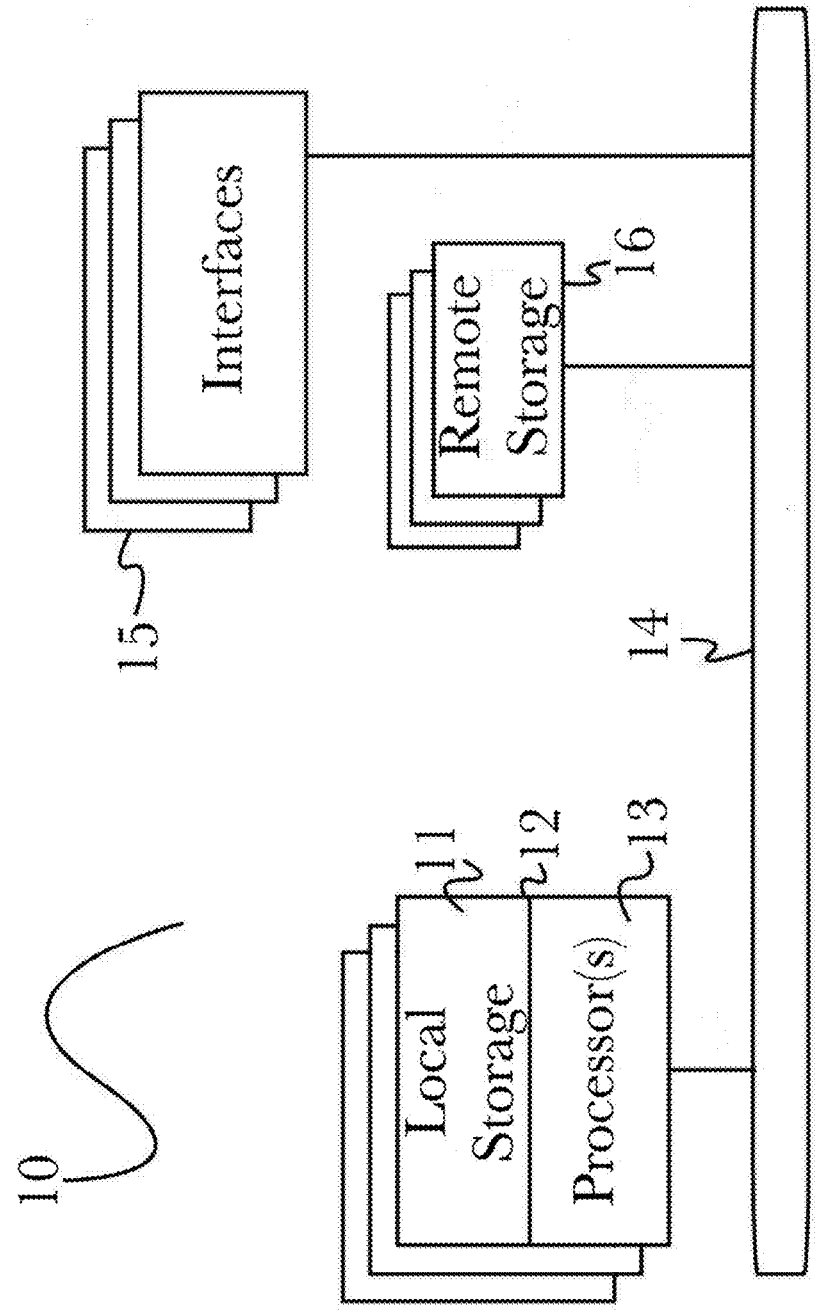
FIG. 7 is a block diagram illustrating an exemplary hardware architecture of a computing device.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 7 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably.

Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
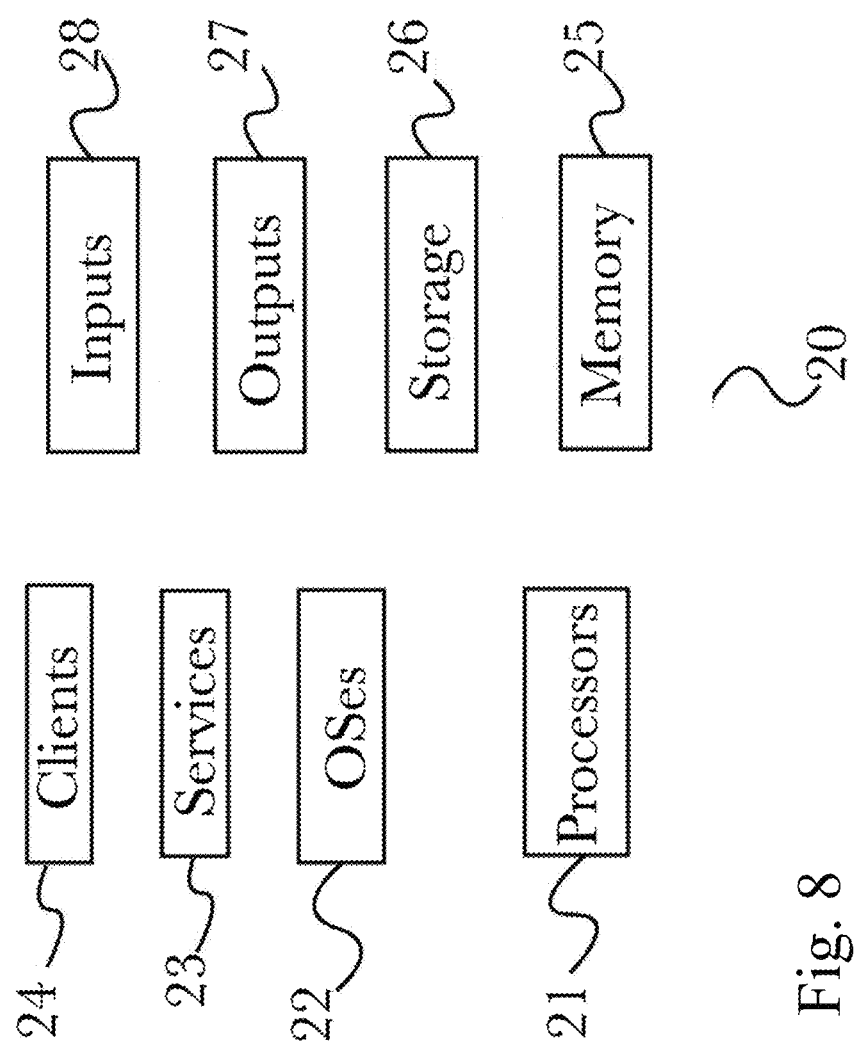
FIG. 8 is a block diagram illustrating an exemplary logical architecture for a client device.

In some aspects, systems may be implemented on a standalone computing system. Referring now to FIG. 8, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
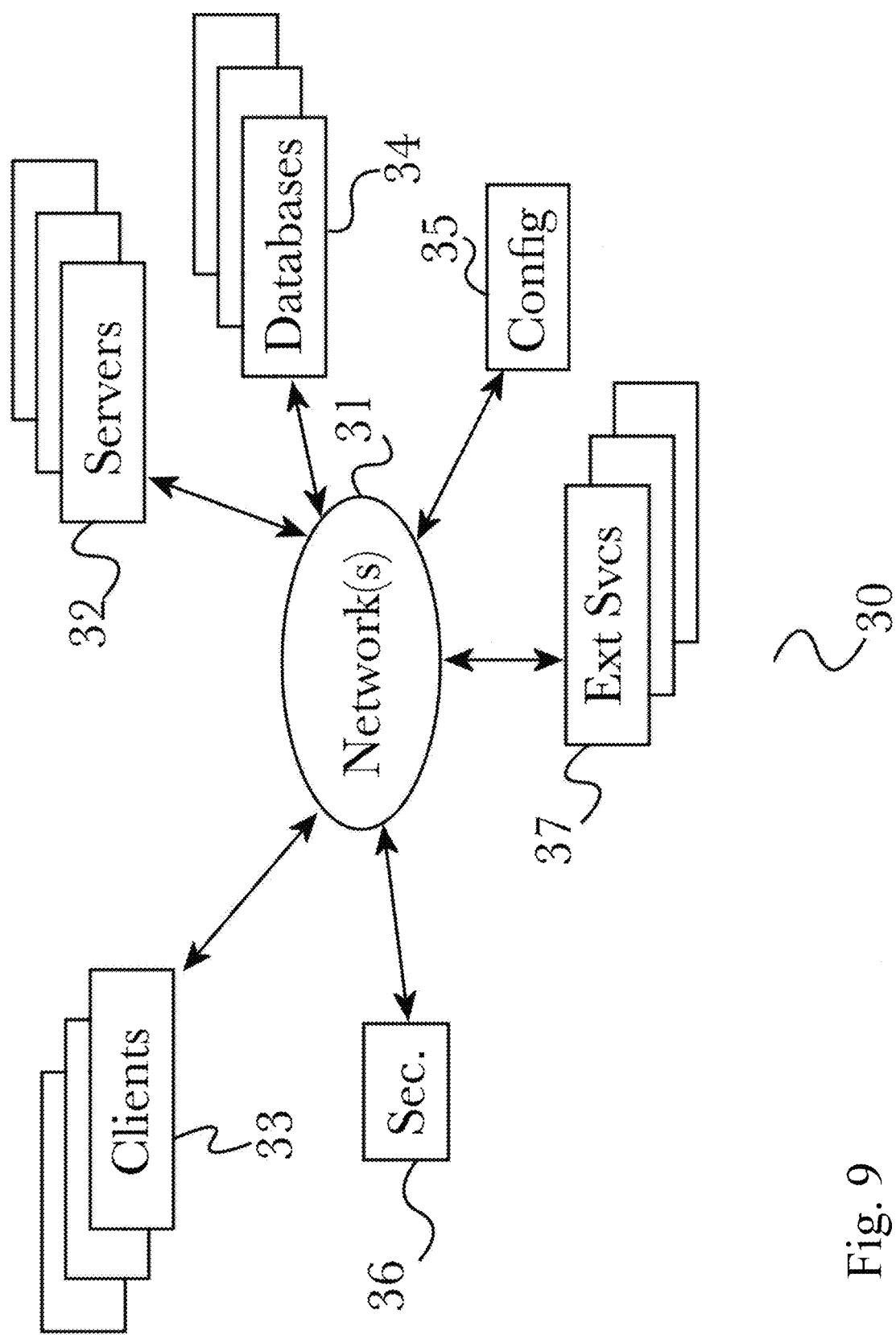
FIG. 9 is a block diagram showing an exemplary architectural arrangement of clients, servers, and external services.

In some aspects, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 10:
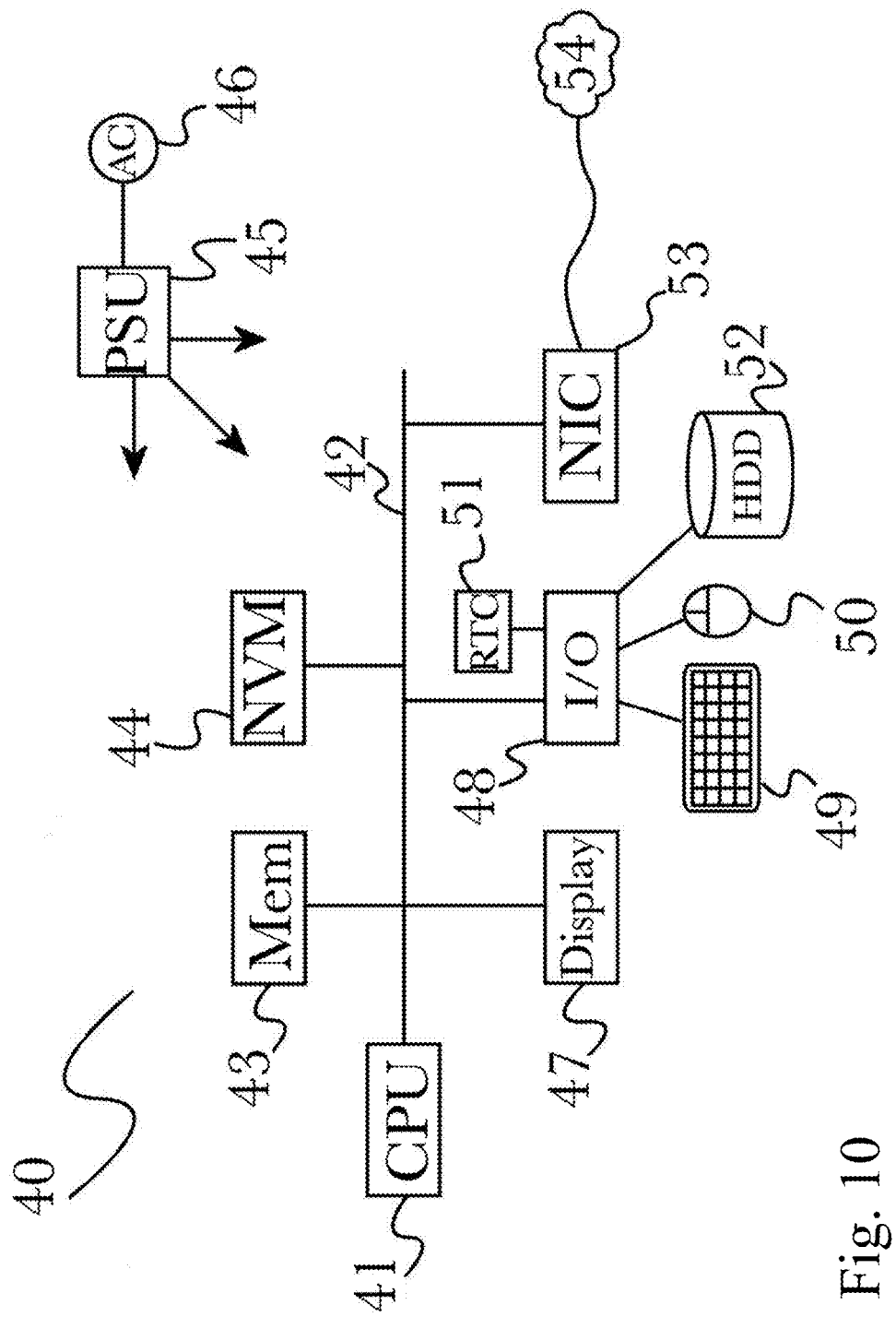
FIG. 10 is another block diagram illustrating an exemplary hardware architecture of a computing device.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for augmented gaming, comprising:
a profile server comprising at least a processor, a memory, and a plurality of programming instructions stored in the memory and operating on the processor, wherein the programming instructions, when operating on the processor, cause the processor to:
store user information in a player profile within a data storage;
associate a plurality of stored player profiles to produce a player network;
receive a unique ID token from a user device;
select a gift order based on the received unique ID token;
receive recipient information from the user device, the recipient information comprising either a shipping address or a stored player profile comprising a shipping address;
transmit the recipient information and the gift order to a retail API;
transmit a game invite to a player profile within the player network;
a retail application programming interface comprising at least a processor, a memory, and a plurality of programming instructions stored in the memory and operating on the processor, wherein the programming instructions, when operating on the processor, cause the processor to:
receive the gift order and recipient information from the profile server;
transmit the gift order and recipient information to a retail provider for fulfillment;

a game engine comprising at least a processor, a memory, and a plurality of programming instructions stored in the memory and operating on the processor, wherein the programming instructions, when operating on the processor, cause the processor to:
  store game rules and game object data corresponding to a game;
  receive gameplay information from a plurality of players participating in the game;
  perform a comparison between the received gameplay information against the stored game rules and game object data;
  generate a notification based on the results of the comparison;
  transmit the generated notification to at least one of the plurality of players.

2. The system of claim 1, further comprising an augmented reality server comprising at least a processor, a memory, and a plurality of programming instructions stored in the memory and operating on the processor, wherein the programming instructions, when operating on the processor, cause the processor to:
  analyze gameplay for at least a portion of the plurality of users during the course of the game;
  generate gameplay information based on the results of the analysis; and
  transmit the gameplay information to the game engine.

3. A method for augmented gaming, comprising the steps of:
  receiving, at a profile server, a unique identification token;
  selecting a gift order based on the unique identification token;
  receiving recipient information, the recipient information comprising either a shipping address or a stored player profile comprising a shipping address;
  transmit, using a retail application programming interface, the gift order and shipping address to a retail provider for fulfillment;
  receive, at a game engine, gameplay information from a plurality of players participating in a game;
  comparing the received gameplay information against stored game rules and game object data;
  generating a notification based on the results of the comparison; and
  transmitting the notification to at least a portion of the plurality of players.

4. The method of claim 3, further comprising the steps of:
  analyzing, using an augmented reality server, gameplay for at least a portion of the plurality of users during the course of the game;
  generating gameplay information based on the results of the analysis; and
  transmitting the gameplay information to the game engine.

* * * * *